United States Patent Office 3,452,714
Patented July 1, 1969

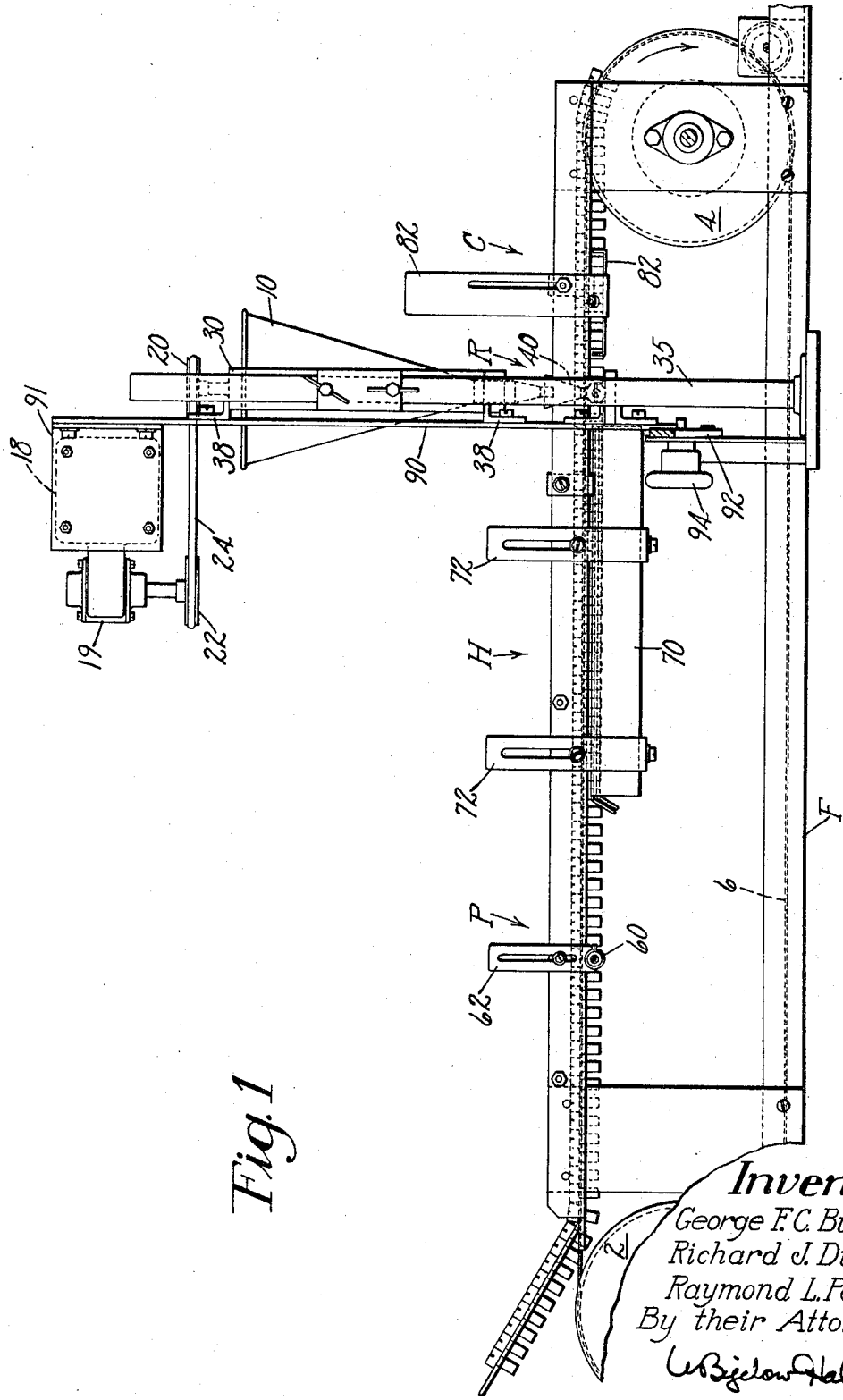

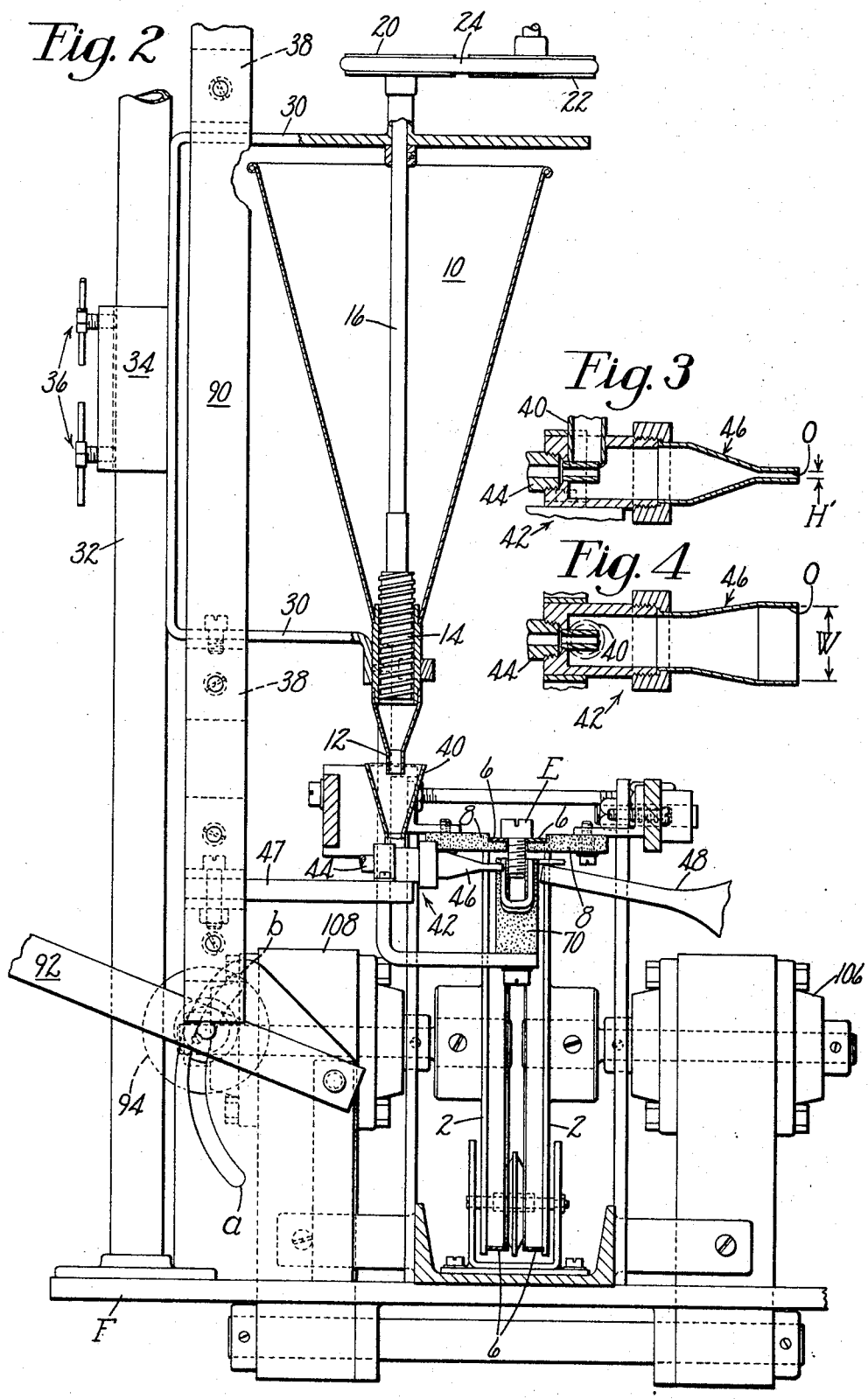

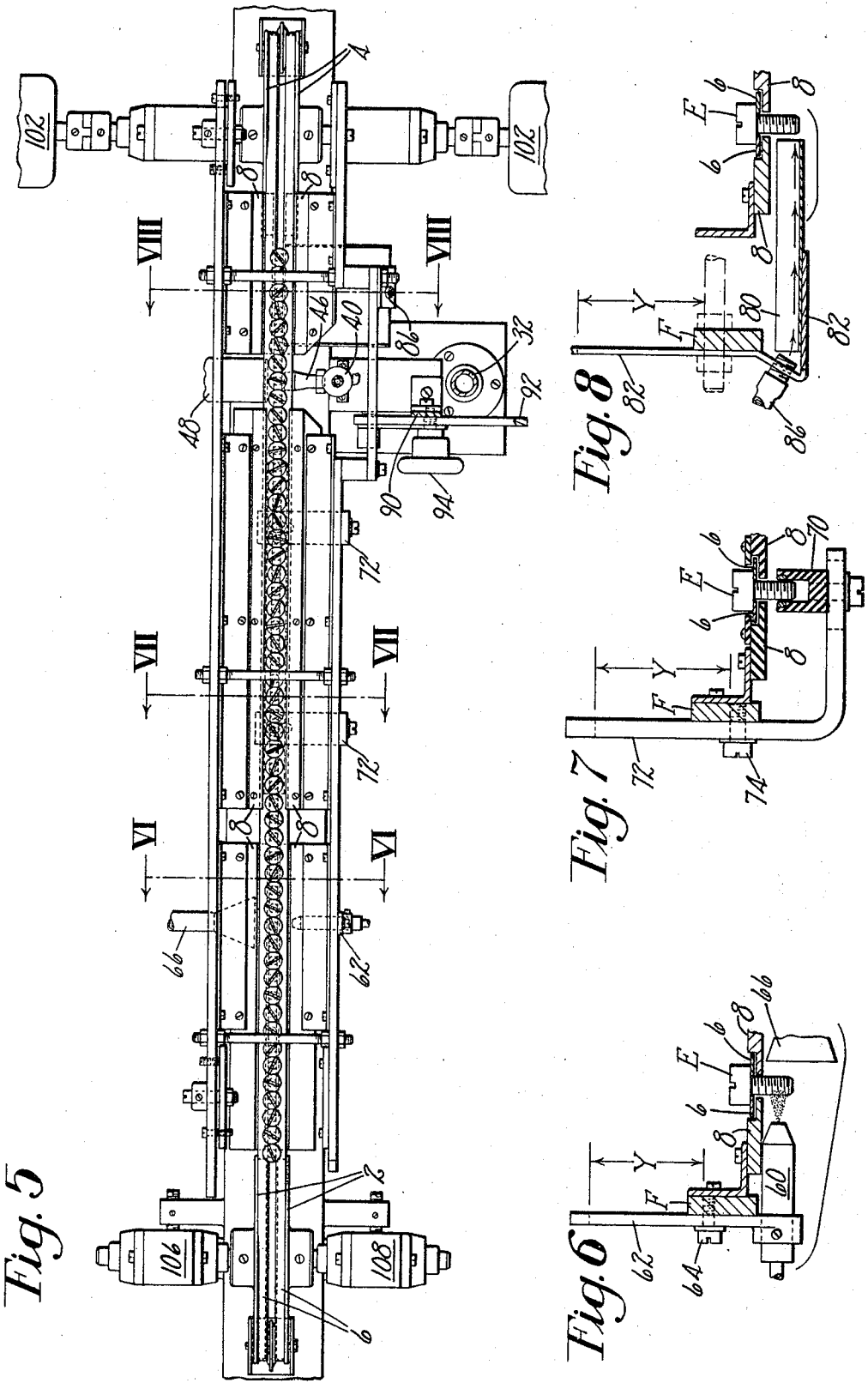

3,452,714
MACHINE FOR APPLYING LOCKING PATCH TO THREADED ELEMENT
George F. C. Burke, Beverly, Richard J. Duffy, Salem, and Raymond L. Peterson, Beverly Farms, Mass., assignors to USM Corporation, Boston, Mass., a corporation of New Jersey
Filed May 23, 1967, Ser. No. 640,639
Int. Cl. B05c 9/14
U.S. Cl. 118—620                                     15 Claims

ABSTRACT OF THE DISCLOSURE

Apparatus for applying a resin patch on the threaded shank portion of a fastener including a pair of parallel conveyor belts which support the heads and carry the shank portions through primer, heating, coating, and cooling stations. Powder is blown from a nozzle onto a portion of the shank in the coating station.

Background of the invention

This invention relates to improvements in a machine for applying a "retarder patch" to a threaded element. The patch is designed to give strong frictional engagement between the element and mating threaded surface and is applied by the method disclosed in U.S. patent application Ser. No. 628,683, filed Apr. 5, 1967 in the name of R. J. Duffy.

It has been proposed heretofore to apply a "retarder patch" to a threaded fastener element by depositing a plastic material in a desired location on the fastener by positioning, contiguous with the fastener, an apparatus such as a die filling the die cavity with the plastic and thereafter heating the die, fastener and plastic to fuse the plastic material to the thread surface of the fastener.

It has further been proposed to utilize an open faced cavity in a suitable nonconductive material with an electrically charged fastener resting therein. The exposed surface of the fastener is to be appropriately shielded to specifically define the shape of the patch and a particulate plastic is then electrostatically deposited thereon. The entire assembly is then heated to cause a fusing between the fastener and the patch.

Although a plastic patch attached by either of these methods provides a locking action between mating threaded elements, the steps of bringing the individual fastener element into register with the die or cavity, supplying the plastic and then heating the entire combination has proven to be time consuming and expensive.

Summary of the invention

It is an object of the present invention to provide a machine which will automatically and rapidly apply a deformable plastic body to the threaded surface of an element thus making it self-locking with its threaded mate. The plastic patch, as applied by the subject machine, will have a shape to allow easy assembly of the mating elements and provide superior resistance to displacement.

To this end, and in accordance with the features of the present invention, we have provided a machine which will automatically handle threaded elements of various sizes, taking the same from a supplying means such as a hopper, or the like, and feeding the elements past various work stations. The various stations of the machine will prepare the element for the patch, heat the element, apply the patch, and release the element for packaging or any other desired operation.

Other and further objects are to provide a machine which will: provide a metal fastener of standard thread form with a plastic coating adequate in size and form and in proper adherence to the metal surface of the thread to create the necessary self-locking torque when used with a complementary threaded element having standard dimensional limits and which will form, without application of work shaping or molding pressures, a patch of plastic material securely bonded to the root, flank and crest surfaces throughout a limited angular extent and for a predetermined number of thread convolutions, a torque locking patch on a threaded element.

A further feature of this machine is that it is a self-contained unit which will aply a locking patch to standard threaded element without resort to other auxiliary apparatus such as heaters.

It is yet another object of the present invention to provide a machine which may rapidly and easily be adjusted to accommodate standard threaded elements of many different sizes and yet each of the sizes will have the applied patch specifically tailored for maximum utility in locking a fastener of that size to its mate.

Still a further object of the present invention is to provide a machine which will rotate the fasteners to be coated at a predetermined rate enabling a circumferential patch to be formed.

The above and other features of the invention including various novel details of construction and combinations of parts will now be more particularly described with reference to the accompanying drawings and pointed out in the claims.

Description of the drawing

FIG. 1 is an elevational view of an illustrative patch applying machine embodying the present invention;

FIG. 2 is a sectional view through the machine at the patch applying station;

FIG. 3 is a vertical section through the patch applying nozzle;

FIG. 4 is a horizontal section through the patch applying nozzle;

FIG. 5 is a plan view of the subject machine;

FIG. 6 is a section along line VI of FIGURE 5;

FIG. 7 is a section along line VII—VII of FIGURE 5;

FIG. 8 is a section along line VIII—VIII of FIGURE 5.

Description of the preferred embodiments

The illustrative machine, as seen in FIGS. 1 and 2 comprises two pairs of pulleys 2, 4, one pair mounted at each end of a frame F, supporting and driving a pair of parallel belts 6. The belts are designed to carry a stream of threaded, headed elements, suspended by their heads, with their shank depending between said belts, through a Station P where a primer is applied to the elements, a Station H where the threaded elements are heated to a predetermined temperature, through a Station R where the plastic patch is applied, and through a Station C where the element is cooled assuring proper solidification of the patch before being released at the end of the belt. Because of the relative weight of the fasteners, the belt is supported throughout the majority of its lentgh by guides 8 rigidly attached to frame F.

The patch applying station

The patch applying station (FIGURE 2) comprises a hopper 10 into which a thermoplastic resin of the type disclosed in the above-noted application of Duffy is placed in a particulate form. At the lower end of the hopper is a nozzle 12 to which is fed a metered amount of powdered resin by a continuously rotating screw 14. The screw 14 is mounted on a shaft 16 driven by an electric motor 18 (FIG. 1) through a reduction gear 19, pulleys 20, 22 and a belt 24. The hopper is adjustably fastened to the framework of the machine by means of horizontally extending U-shaped bracket 30 which is slidably fastened to an upright pipe 32 by means of a collar 34 and a pair of thumb screws 36. The use of a slidable collar and thumb screws allows the hopper to be vertically adjusted upon a pipe 32 for purposes to be later described. The pipe 32 is rigidly mounted upon frame F.

Bracket 30 is likewise rigidly attached to a vertically extending movable bar 90 which supports the motor 18 by means of an L-bracket 91 (FIG. 1). The fixed attachment of the hopper mechanism to the motor support assures a constant vertical spacial relation between the motor 18 and the driven shaft 16.

Mounted beneath the screw feed 14 and surrounding nozzle 12 is a funnel 40 which is closed at its lowermost end by a manifold 42 (best seen in FIGS. 3 and 4) having an air inlet 44 to the left of the manifold as seen in FIG. 2 and a nozzle 46 to the right in the same figures.

The funnel 40, manifold 42, air inlet 44, and nozzle 46 are all fixedly supported by a bar 47 rigidly attached to vertically movable bar 90, assuring a constant relationship between the hopper 10 and the nozzle apparatus.

As the powdered resin is fed into the funnel 40, a steady stream of air flows into the manifold 42 fed from the hopper to be combined with the air and from any standard pressurized source through inlet 44 causing the powdered resin to be forced through the nozzle 46 onto a workpiece comprising a threaded element E suspended between the pair of belts 6 and moved by the belts across the front of the nozzle orifice. Mounted directly opposite the nozzle 46 is a vacuum exhaust 48 which assists in placing a uniform patch on the element E by providing a continuous air movement around the element and further removes excess powdered resin not adequately adhered to the element.

The nozzle

The illustrative nozzle 46 (FIGS. 3 and 4) has a greater horizontal dimension than vertical. The height and width of applied stream of resin is varied by interchanging nozzles. The size of the nozzle selected depends upon the size of the element to receive the patch. Nozzle selection is dictated to the extent that it is desirable to have a patch of a definite configuration with respect to the number of threads covered and of a thickness sufficient to cause the friction resistance desired between the two mated elements. Assuming uniform application rate, provided by screw 14, the height H' of the nozzle orifice O will, with a certain degree of accuracy, determine the number of threads covered, and the width W of the orifice O will, in conjunction with the speed of delivery of the element E along the belt, determine the thickness of the patch. Thus, it can be seen that a relatively uniform patch can be provided by an inexpensive, easily maintainable mechanism. As explained below, the remainder of the mechanism can easily be adjustable to accommodate elements of a large variety of sizes.

Priming station

As can be seen in FIGURE 1, the priming station precedes the heating station H and the patch applying station R which applies a liquid primer to the fastening element, and comprises, as seen in FIGURE 6, a nozzle 60 mounted by a slotted bracket 62 which is vertically adjustable to the extent indicated by the dimension Y. The adjustment is made by loosening the bolt 64 which fastens the slotted bracket 62 to the main frame F. Thus, it can be seen that the priming station may readily be adjusted to accommodate fasteners of various sizes and prime the fastener at the appropriate portion to assure a secure bond with the patch. As in the case of the patch applying station, the nozzle can be readily changed to provide appropriate coverage by the primer. The primer can be supplied by any commercially available means not a part of this invention and is not shown. It is to be noted that the nozzle sprays directly into an exhaust tube 66 which will remove any excess material not applied to the fastener as well as any fumes. It is fully within the scope of this invention that the primer could equally well be applied with a brush or roller to minimize waste where appropriate.

Heating station

The heating station H, as shown in FIGURE 7, comprises a high frequency electric field created within the channel-shaped element 70 connected to a high frequency generator and mounted beneath the parallel belts 6 and designed to straddle the fastener being processed. The heater 70 is attached to a bracket 72 which is vertically adjustable to the extent of dimension Y by loosening the bolt 74 which attaches the slotted bracket to the main frame F and moving the bracket to the most efficient heating position. The size of the heater may be varied to handle the variety of fastener sizes. The belts are preferably non-metallic to prevent the buildup of a charge in the belt which is annoying and could well be dangerous.

Cooling station

The cooling station comprises a deflector 80 to direct a stream of cool air toward the element as it is carried by parallel belts 6 after the patch is applied. The deflector means is rigidly attached to a vertically adjustable slotted bracket 82 adjustable to the extent of dimension Y. A stream of air is provided to the directing means through a hose 86 from any pressurized source.

Adjustment

As has been pointed out above, the priming station, the heating station, and the cooling station are all vertically adjustable. It is to be noted that the resin applying station is likewise vertically adjustable as can be seen in FIGURE 2. The resin applying mechanism described above is rigidly attached to a bracket 30 which is in turn rigidly fastened to a vertically extending bar 90. The lowermost end of the vertically reciprocable bar 90 rests upon a movable rod extending through a portion of the frame F and rigidly attached to a handle 92. An arc is cut in the frame F from positions A to B enabling the rod to be moved to this extent, controlled by the handle 92 pivotally attached at its lowermost end to the frame F. To adjust the vertical position of the resin applying station, the two thumb screws 36, its knob 94, are loosened by appropriate movement of the handle 92 after which elements 36 and 94 will again be tightened assuring uniformity of patch position.

The opposite end of rod 90 is threaded and capped by a mating knob 94. The threaded rod 90, extending through handle 92, and mating knob 94 allow easy fixation of the handle relative to the frame by simple frictional contact.

The vertical adjustment of the various stations allow the machine to be used for fasteners of a variety of lengths. The patch applying machine may readily be adjusted to handle the screws of greater dimension by replacing the induction heater by one of greater dimensions and by varying the separation of the pair of belts 6. The horizontal separation of the belts 6 is accomplished by moving each of the pulleys upon their respective shafts. It is to be noted that each of the belts are driven by variable speed motor 102. The use of the variable speed motors allows the operator to adjust the speed of travel of the fasteners, assuring a sufficient time of exposure to the various stations. The fact that a separate motor is used for each belt allows them to travel at different speeds which will cause the fasteners to rotate enabling an encircling patch to be applied, useful when a seal around the bolt is needed. The pulleys at the opposite end of the machine are each supported by a separate bearing 106, 108 allowing necessary individual adjustment of the separate belts to assure constant tension and alignment.

It may readily be seen from the discussion above that when a demand for a given size fastener is received by the operator of the subject machine, he will make appropriate adjustments to the separation of the belts 6, the height of the priming station P, the resin applying station R and the cooling station C. A heating element of appropriate size will be placed at the heating station H and a nozzle of appropriate dimensions placed upon the resin applying station R. Once these adjustments are made the operator need only make sure there is a supply of the fasteners, the resin and the primer.

Adjustments of the machine need not again be made until it is desired to process a different size fastener element.

Having thus described our invention, what we claim as new and desire to secure by Letters Patent of the United States is:

1. An automatic machine for applying locking patches at a desired location on the threaded shank portion of the fastener comprising conveyor means including a pair of parallel belts for supporting said fasteners with the shanks depending therebetween and for conveying the fasteners in uniform orientation such that the shank portions are sequentially moved through operating stations located on the shank side of said belts of the machine, and means for feeding fasteners one at a time to the conveying means, said operating stations comprising in sequence a station having means for applying heat to the fastener shanks, a station having a spray nozzle disposed for applying a resin to the fastener shanks, and a station having means for applying cooling media to the fastener shanks, means connected to said nozzle for supplying particulate plastic coating material contained in an air stream to said nozzle, and said nozzle being located below said belts and adjacent said shanks to apply a coating to a portion only of the threaded shank portion.

2. A machine as set forth in claim 1 wherein said belts are supported throughout a major portion of their length and are provided with means for adjustable movement one relative to the other to accommodate a plurality of fastener shank diameters.

3. A machine as in claim 1 wherein the heating station includes a heater of the induction type.

4. A machine as in claim 3 wherein the belts are non-metallic to avoid developing an electric charge therein.

5. A machine as in claim 1 wherein said means for applying plastic particulate material to the nozzle comprises a hopper to hold particulate plastic, a feed screw to regulate the flow from the hopper and a manifold for combining pressurized air with the particles and spraying the combination upon the fastener.

6. A machine as in claim 5 wherein a nozzle is attached to the manifold and the nozzle orifice has a greater dimension in a direction parallel to the movement of the belt than transverse thereof.

7. A machine as in claim 6 including means for interchanging nozzles of varying dimensional configuration.

8. A machine as in claim 7 including means for moving the belts at different speeds for rotating the fastener, thus allowing the patch to completely encircle the fastener.

9. A machine as in claim 8 wherein the nozzle orifice is of elongate cross section, the greatest dimension extending parallel to the belt movement.

10. A machine as in claim 9 including means for interchanging nozzles of varying dimensional configuration.

11. A machine as in claim 1 wherein said patch applying station further comprises means for readily adjusting said nozzle in a direction substantially parallel to the longitudinal direction of the shank of a fastener disposed on said belts to thereby apply the patch at a specific location on the fastener.

12. An automatic machine for applying locking patches to headed fasteners comprising;
    (a) a pair of parallel belts mounted for horizontal movement along a frame;
    (b) means for continuously supplying fasteners to the belts on which the heads of the fasteners are supported with their threaded shanks depending therebetween;
    (c) a series of work stations disposed adjacent the shank side of the belts in sequence comprising a station having means for applying a primer to the fastener shank, a station having means for applying heat to the fastener shanks, and a station having a spray nozzle disposed for applying an individually tailored patch to the shank of each fastener;
    (d) means connected to said nozzle for supplying particulate plastic coating material entrained in an air stream to said nozzle, said nozzle being located below said belts and adjacent said shanks to apply a coating to a portion only of the threaded shank portion.

13. A machine as set forth in claim 12 wherein said belts are supported throughout a major portion of their length and are provided with means for adjustable movement one relative to the other to accommodate a plurality of fastener shank diameters.

14. A machine as in claim 12 wherein said means for supplying plastic particulate material to the nozzle comprises a hopper to hold the particulate plastic, a continually turning screw to feed a uniform amount of plastic from the hopper, and a manifold to combine pressurized air and the particulate plastic and force the mixture through a nozzle.

15. A machine as in claim 12 wherein said patch applying station further comprises means for readily adjusting said nozzle in a direction substantially parallel to the longitudinal direction of the shank of a fastener disposed in said belts to thereby apply the patch at a specific location on the fastener.

References Cited

UNITED STATES PATENTS

| | | | |
|---|---|---|---|
| 2,579,737 | 12/1951 | Giordano | 118—322 X |
| 3,291,630 | 12/1966 | Deyle et al. | |
| 3,310,205 | 3/1967 | Meyer | 118—308 X |
| 3,311,085 | 3/1967 | Smith | 118—326 X |
| 3,323,492 | 6/1967 | Mellar et al. | 118—620 |
| 3,344,769 | 10/1967 | Williams | 118—324 X |

ROBERT W. MICHELL, *Primary Examiner.*

JOHN P. McINTOSH, *Assistant Examiner.*

U.S. Cl. X.R.

118—69, 308, 322